(12) United States Patent
Focazio et al.

(10) Patent No.: US 7,266,561 B2
(45) Date of Patent: Sep. 4, 2007

(54) METHOD AND APPARATUS FOR SPLITTING AND MERGING REQUEST AND RESPONSE DATA AT RUNTIME

(75) Inventors: Robyn Lee Focazio, Round Rock, TX (US); Fabian F. Morgan, Austin, TX (US); Brent Russel Phillips, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 10/803,630

(22) Filed: Mar. 18, 2004

(65) Prior Publication Data

US 2005/0210053 A1    Sep. 22, 2005

(51) Int. Cl.
  *G06F 17/00* (2006.01)
  *G06F 7/00* (2006.01)
(52) U.S. Cl. .............................. 707/101; 707/1; 707/3; 707/100
(58) Field of Classification Search ................ 707/1, 707/3, 100, 103 R; 715/513
See application file for complete search history.

(56) References Cited

U.S. PATENT DOCUMENTS

| | | | |
|---|---|---|---|
| 6,356,906 B1 | 3/2002 | Lippert et al. ................ 707/10 |
| 6,356,907 B1 | 3/2002 | Hopmann ..................... 707/10 |
| 6,418,448 B1 | 7/2002 | Sarkar ...................... 707/104.1 |
| 6,449,620 B1 | 9/2002 | Draper et al. ................ 707/102 |
| 6,523,040 B1* | 2/2003 | Lo et al. ..................... 707/101 |
| 6,611,843 B1 | 8/2003 | Jacobs ........................ 707/102 |
| 6,801,915 B1* | 10/2004 | Mack ........................ 707/100 |
| 2002/0120685 A1 | 8/2002 | Srivastava et al. |
| 2003/0050932 A1* | 3/2003 | Pace et al. .................. 707/100 |
| 2004/0024888 A1 | 2/2004 | Davis et al. |
| 2004/0181537 A1 | 9/2004 | Chawla et al. |
| 2005/0216498 A1 | 9/2005 | Georgalas et al. |

OTHER PUBLICATIONS

U.S. Appl. No. 10/756,932, Focazio et al. Method and Apparatus for Validating and Configuring Database Transaction Requests from Multiple Clients, filed Jan. 14, 2004.
U.S. Appl. No. 10/803,658, Focazio et al., Method and Apparatus for Generating Query and Response Statements at Runtime from Generic Requests.

* cited by examiner

*Primary Examiner*—John Cottingham
*Assistant Examiner*—Susan F Rayyan
(74) *Attorney, Agent, or Firm*—Duke W. Yee; David A. Mims, Jr.; Gerald H. Glanzman

(57) ABSTRACT

A method in a data processing system for generating return data responsive to a database request is provided. A response from a data store is detected. A merge reference section in a singleton in-memory object is located. A merge reference of the merge reference section is identified. A reference column from the merge reference is determined and data is merged with the reference column to form a merged value according to an order. The merged value is then placed in the response.

13 Claims, 17 Drawing Sheets

FIG. 6A

```xml
<?xml version="1.0" encoding="UTF-8"?>
<xsd:schema version="1.0" xml:lang="en-US"
targetNamespace="http://www.ibm.com/esm"
xmlns:xsd="http://www.w3.org/2001/XMLSchema" xmlns="http://www.ibm.com/esm"
xmlns:etcML="http://www.ibm.com/v1/etcML" elementFormDefault="qualified"
attributeFormDefault="qualified">
<xsd:import namespace=http://www.ibm.com/v1/etcML
schemaLocation="etcml_redefines.xsd" />
```
— 602

602 {
```xml
<xsd:element name="esmML" type="etcML:etcRootType">  — 604
    <xsd:annotation>
        <xsd:documentation xml:lang="en-us">Root element for our new
        extended esm language.</xsd:documentation>
    </xsd:annotation>
</xsd:element>
```

606 {
```xml
<xsd:complexType name="ESMResponseBodyType">
    <xsd:annotation>
        <xsd:documentation>ESM customized response Body</xsd:documentation>
    </xsd:annotation>
    <xsd:complexContent>
        <xsd:extension base="etcML:ResponseBodyType">      608
            <xsd:sequence>
                <xsd:element name="RowSet" type="RowSetType"
                minOccurs="0" maxOccurs="1" />
                <xsd:element name="Properties"
                type="PropertiesType" minOccurs="0" maxOccurs="1" />
            </xsd:sequence>
        </xsd:extension>           610
    </xsd:complexContent>
</xsd:complexType>
```

612 {
```xml
<xsd:complexType name="ParameterType">
    <xsd:complexContent>
        <xsd:extension base="etcML:ParameterType">  614
            <xsd:sequence>
                <xsd:element ref="etcML:RequestedFields" minOccurs="1"
                maxOccurs="1" />        — 616
                <xsd:element ref="etcML:StartRow" minOccurs="0"
                maxOccurs="1" />
                <xsd:element ref="etcML:MaxRowCount" minOccurs="0"
                maxOccurs="1" />        — 618
                <xsd:element ref="etcML:DisplayRowCount" minOccurs="0"
                maxOccurs="1" />
                <xsd:element name="RowSet" type="RowSetType"
                minOccurs="0" maxOccurs="1" />
            </xsd:sequence>
        </xsd:extension>
    </xsd:complexContent>
<xsd:complexType>
```

FIG. 6B

```
       ┌ <xsd:complexType name="PropertiesType">
       │     <xsd:complexContent>
       │         <xsd:extension base="etcML:TicketingRecordSetType">
       │             <xsd:sequence maxOccurs="unbounded" minOccurs="1">
 620 ┤                   <xsd:element name="Property" type="FieldType" />
       │             </xsd:sequence>                                    \
       │         </xsd:extension>                                       622
       │     </xsd:complexContent>
       └ </xsd:complexType>

┌ <xsd:complexType name="RowSetType">
       │     <xsd:complexContent>
       │         <xsd:extension base="etcML:TicketingRecordSetType">
       │             <xsd:sequence maxOccurs="unbounded" minOccurs="1">
       │                 <xsd:element name="Row" type="RowType" />
 628 ┤             </xsd:sequence>         ↳ 629
       │             <xsd:attribute name="name" type="xsd:string" />
       │         </xsd:extension>
       │     </xsd:complexContent>
       └ </xsd:complexType>

┌ <xsd:complexType name="FieldType"> 624
       │     <xsd:sequence>
 623 ┤         <xsd:element name="name" type="xsd:string" />
       │         <xsd:element name="value" type="xsd:string" />
       │     </xsd:sequence>               \
       └ </xsd:complexType>                626

┌ <xsd:complexType name="RowType">           632
       │     <xsd:sequence minOccurs="0">           /
       │         <xsd:element name="Column" type="ColumnType" minOccurs="0"
       │     maxOccurs="unbounded" />
 630 ┤         <xsd:element name="RowSet" type="RowSetType" minOccurs="0"
       │     maxOccurs="unbounded" />                       \
       │     </xsd:sequence>                                634
       │     <xsd:attribute name="name" type="xsd:string" />
       │     <xsd:attribute name="rowNumber" type="xsd:positiveInteger" />
       └ </xsd:complexType>

┌ <xsd:complexType name="ColumnType">
       │     <xsd:complexContent>
       │         <xsd:extension base="FieldType">           638
       │             <xsd:sequence>                          /
 636 ┤                 <xsd:element name="enums" type="EnumsType" minOccurs="0" />
       │                 <xsd:element name="metadata" type="MetadataType" minOccurs="0" />
       │             </xsd:sequence>
       │         </xsd:extension>
       │     </xsd:complexContent>
       └ </xsd:complexType>

┌ <xsd:complexType name="EnumsType">
       │     <xsd:sequence maxOccurs="unbounded" minOccurs="1">
 640 ┤         <xsd:element name="enum" type="xsd:string" />
       │     </xsd:sequence>
       └ </xsd:complexType>
```

FIG. 7A

```xml
<?xml version="1.0" encoding="UTF-8"?>
<xsd:schema xml:lang="en-us" version="1.0" elementFormDefault="unqualified"
xmlns:xsd="http://www.w3.org/2001/XMLSchema" attributeFormDefault="unqualified"
targetNamespace="http://www.ibm.com/v1/etcML"
xmlns="http://www.ibm.com/v1/etcML" xmlns:Q1="http://www.ibm.com/etc">
```
⟵ 700

702 {
```xml
    <xsd:complexType name="etcRootType">              704
        <xsd:sequence minOccurs="1" maxOccurs="1">
            <xsd:element name="Transactions" type="TransactionsContainerType"
            minOccurs="0" maxOccurs="1" />
        </xsd:sequence>
        <xsd:attribute name="ID" type="xsd:ID" use="optional" />
    </xsd:complexType>
```

706 {
```xml
    <xsd:complexType name="TransactionsContainerType">     708
        <xsd:choice minOccurs="1" maxOccurs="1">
            <xsd:element name="Request" type="TransactionRequestType"
            minOccurs="0" maxOccurs="1"> </xsd:element>
            <xsd:element name="Response" type="TransactionResponseType"
            minOccurs="0" maxOccurs="1"> </xsd:element>
        </xsd:choice>                                          710
    </xsd:complexType>
```

712 {
```xml
    <xsd:complexType name="TransactionRequestType">  714
        <xsd:complexContent>
            <xsd:extension base="TransactionType">          716
                <xsd:sequence>
                    <xsd:element name="SystemID" type="ProviderType"
                                                minOccurs="0"
                    maxOccurs="1"> </xsd:element>
                    <xsd:element name="TransactionType"
                    type="ProviderActionType" minOccurs="1" maxOccurs="1">
                    </xsd:element>
                    <xsd:element name="Parameters"
                    type="ParameterType"> </xsd:element>
                </xsd:sequence>
            </xsd:extension>               718
        </xsd:complexContent>
    </xsd:complexType>
```

720 {
```xml
    <xsd:complexType name="TransactionType">
        <xsd:attribute name="userID" type="xsd:string" use="required" />
        <xsd:attribute name="password" type="xsd:string" use="optional" />
        <xsd:attribute name="timeStamp" type="xsd:dateTime" use="required" />
        <xsd:attribute name="languageCode" type="LanguageCodeType" use="required" />
        <xsd:attribute name="countryCode" type="CountryCodeType" use="required" />
        <xsd:attribute name="timeZone" type="TimeZoneType" use="required" />
    </xsd:complexType>
```

722 {
```xml
    <xsd:simpleType name="ProviderType">
        <xsd:restriction base="xsd:string">
            <xsd:enumeration value="e-ESM61"/>  724
            <xsd:enumeration value="e-ESM44"/>  726
        </xsd:restriction>
    </xsd:simpleType>
```

FIG. 7B

```
<xsd:complexType name="TransactionFilteredRequestType">
    <xsd:complexContent>
        <xsd:extension base="TransactionRequestType">
            <xsd:sequence>                    732
                <xsd:element ref="Filters" minOccurs="0"
                        maxOccurs="1"></xsd:element>
                                                            734
                <xsd:element ref="Sort" minOccurs="0"
                        maxOccurs="1"></xsd:element>
            </xsd:sequence>
        </xsd:extension>
    </xsd:complexContent>
</xsd:complexType>
```
730

```
<xsd:element name="Sort">
    <xsd:complexType>
        <xsd:sequence maxOccurs="1" minOccurs="1"
            <xsd:element ref="SortOrder" minOccurs="1"
                    maxOccurs="unbounded" />
        </xsd:sequence>                    738
    </xsd:complexType>
</xsd:element>
```
736

```
<xsd:element name="SortOrder" type="SortOrderType" />
```

```
<xsd:complexType name="SortOrderType">
    <xsd:sequence minOccurs="1" maxOccurs="1">
        <xsd:element ref="Value" minOccurs="1"
            maxOccurs="1"></xsd:element>
        </xsd:sequence>                744
        <xsd:attribute name="operator"
                type="SQLGroupByOperatorType"></xsd:attribute>
</xsd:complexType>
```
742

```
<xsd:element name="Value" type="xsd:string"></xsd:element>
```

```
<xsd:simpleType name="SQLGroupByOperatorType">
    <xsd:restriction base="xsd:string">         748
        <xsd:enumeration value="Ascending"></xsd:enumeration>
        <xsd:enumeration value="Descending"></xsd:enumeration>
    </xsd:restriction>
</xsd:simpleType>                    750
```
746

```
<xsd:element name="Filters">
    <xsd:complexType>                        754
        <xsd:sequence maxOccurs="unbounded">
            <xsd:element ref="Filter" minOccurs="0"
                    maxOccurs="unbounded" />        756
            <xsd:element ref="Filters" minOccurs="0"
                    maxOccurs="unbounded" />
        </xsd:sequence>                758
        <xsd:attribute name="operator"
                type="SQLConditionJoinOperatorType" use="required" />
```
752

FIG. 7C

```
        ⎧  <xsd:simpleType name="SQLConditionJoinOperatorType">
        ⎪      <xsd:restriction base="xsd:string">
        ⎪          <xsd:enumeration value="And">╱762
        ⎪          </xsd:enumeration>
   760 ⎨          <xsd:enumeration value="Or">╱764
        ⎪          </xsd:enumeration>
        ⎪      </xsd:restriction>
        ⎩  </xsd:simpleType>

<xsd:element name="Filter" type="FilterType" />

⎧  <xsd:complexType name="FilterType">
        ⎪      <xsd:sequence minOccurs="0" maxOccurs="unbounded">
        ⎪          <xsd:element ref="Value" minOccurs="1" maxOccurs="unbounded" />
        ⎪      </xsd:sequence>
   768 ⎨      <xsd:attribute name="key" type="xsd:string" use="required" />
        ⎪      <xsd:attribute name="operator" type="SQLConditionOperatorType"  ╱770
        ⎪      use="required" />
        ⎩  </xsd:complexType>

⎧  <xsd:simpleType name="SQLConditionOperatorType">
        ⎪      <xsd:restriction base="xsd:string">
        ⎪          <xsd:enumeration value="Equal"> </xsd:enumeration>
        ⎪          <xsd:enumeration value="GreaterThan"> </xsd:enumeration>
        ⎪          <xsd:enumeration value="LessThan"> </xsd:enumeration>
        ⎪          <xsd:enumeration value="GreaterThanOrEqualTo"> </xsd:enumeration>
        ⎪          <xsd:enumeration value="LessThanOrEqualTo"> </xsd:enumeration>
   772 ⎨          <xsd:enumeration value="NotEqualTo"> </xsd:enumeration>
        ⎪          <xsd:enumeration value="Like"> </xsd:enumeration>
        ⎪          <xsd:enumeration value="In"> </xsd:enumeration>
        ⎪          <xsd:enumeration value="Between"> </xsd:enumeration>
        ⎪          <xsd:enumeration value="NotIn"> </xsd:enumeration>
        ⎪          <xsd:enumeration value="NotBetween"> </xsd:enumeration>
        ⎪      </xsd:restriction>
        ⎩  </xsd:simpleType>

⎧  <xsd:complexType name="TransactionResponseType">
        ⎪      <xsd:complexContent>
        ⎪          <xsd:extension base="TransactionType">
        ⎪              <xsd:sequence minOccurs="1" maxOccurs="1">
        ⎪                  <xsd:element name="SystemID" type="ProviderType"
        ⎪              minOccurs="0" maxOccurs="1"> </xsd:element>
        ⎪                  <xsd:element name="TransactionType"
        ⎪              type="ProviderActionType" minOccurs="1"
        ⎪              maxOccurs="1"> </xsd:element>
   774 ⎨                  <xsd:element name="ErrorCode"
        ⎪              type="ProviderErrorCodeType"╱778
        ⎪                  minOccurs="1" maxOccurs="1" />
        ⎪                  <xsd:element name="ResponseDescription"
        ⎪              type="xsd:string" minOccurs="1" maxOccurs="1" />
        ⎪                  <xsd:element name="Body" type="ResponseBodyType"╲
        ⎪              minOccurs="0" maxOccurs="1" />                       ╲776
        ⎪              </xsd:sequence>
        ⎪          </xsd:extension>
        ⎪      </xsd:complexContent>
        ⎩  </xsd:complexType>
```

```
<xsd:simpleType name="ProviderErrorCodeType">
        <xsd:restriction base="xsd:string">
                <xsd:enumeration value="0">        /782
                        <xsd:annotation>
                                <xsd:documentation xml:lang="en-us">Successful    /784
                                  transaction</xsd:documentation>
                        </xsd:annotation>
                </xsd:enumeration>
                <xsd:enumeration value="10000">    /786
                        <xsd:annotation>
                                <xsd:documentation xml:lang="en-us">System
                    788—  failure</xsd:documentation>
                        </xsd:annotation>
                </xsd:enumeration>
        </xsd:restriction>
</xsd:simpleType>
```

780 { (above block)

```
</xsd:schema>
```

```
<?xml version="1.0" encoding="UTF-8"?>
<xsd:schema targetNamespace="http://www.ibm.com/v1/etcML"
xmlns:xsd="http://www.w3.org/2001/XMLSchema"
xmlns="http://www.ibm.com/v1/etcML" attributeFormDefault="unqualified"
elementFormDefault="unqualified">

<xsd:redefine schemaLocation="etcml.xsd">
        <xsd:simpleType name="ProviderActionType">
                <xsd:restriction base="ProviderActionType">
                        <xsd:enumeration value="add" />
                        <xsd:enumeration value="delete" />
                        <xsd:enumeration value="get" />
                        <xsd:enumeration value="list" />
                        <xsd:enumeration value="validate" />
                        <xsd:enumeration value="modify" />
                </xsd:restriction>
        </xsd:simpleType>

<xsd:simpleType name="ProviderErrorCodeType">
                <xsd:restriction base="ProviderErrorCodeType">
                        <xsd:minInclusive>0</xsd:minInclusive>
                        <xsd:maxInclusive>12000</xsd:maxInclusive>
                </xsd:restriction>
        </xsd:simpleType>
</xsd:redefine>
</xsd:schema>
```

*FIG. 8*

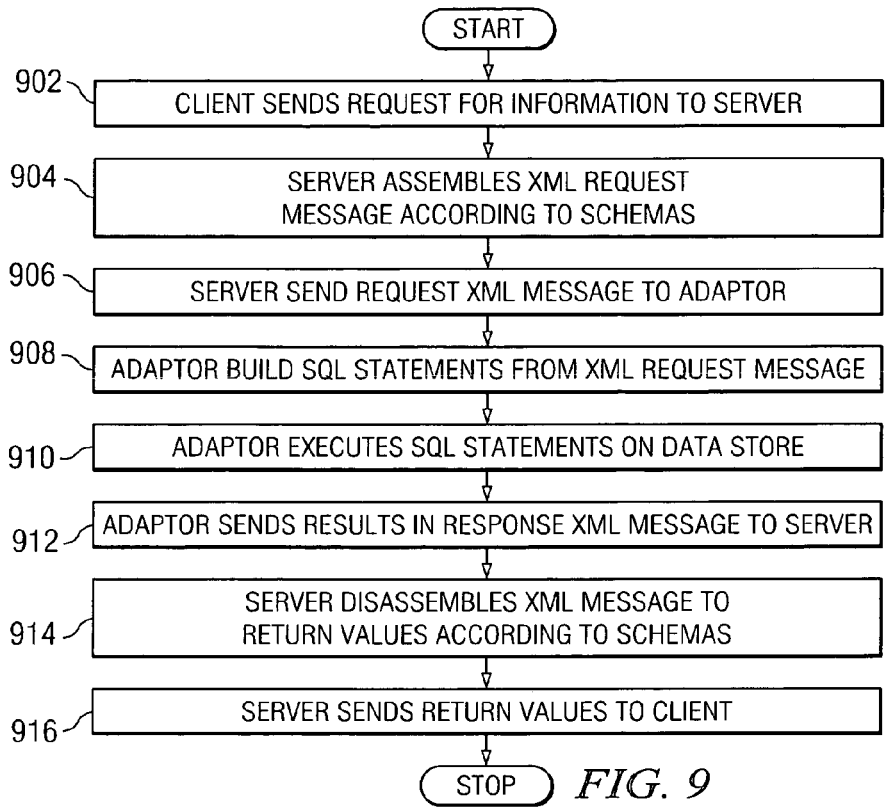

FIG. 9

```
<?xml version="1.0" encoding="UTF-8"?>
<esm:esmML xmins:xsi="http://www.w3.org/2001/XMLSchema-instance"
   xmins:esm="http://www.ibm.com/esm" xmins:etcML="http://www.ibm.com/v1/etcML" ID="1">
   <Transactions>
      <Request xsi:type="esm:ObjectRequestType" countryCode="fr" languageCode="FR"
   timeZone="" esm:agentID="EXAV" esm:userTrace="false">
         <SystemID>eESM630</SystemID>
         <TransactionType>list</TransactionType>
         <Parameters xsi:type="esm:ParameterType">
            <etcML:RequestedFields>
               <RequestedField>ProblemTicket.id</RequestedField>
               <RequestedField>ProblemTicket.Person.id</RequestedField>
            </etcML:RequestedFields>
            <etcML:StartRow>1</etcML:StartRow>
            <etcML:DisplayRowCount>10</etcML:DisplayRowCount>
         </Parameters>
         <etcML:Filters operator="AND">
            <etcML:Filter key="ProblemTicket.id" operator="NotEqualTo">
               <etcML:Value>L</etcML:Value>
            </etcML:Filter>
         </etcML:Filters>
         <esm:TransactionTarget>ProblemTicket</esm:TransactionTarget>
      </Request>
   </Transactions>
</esm:esmML>
```

FIG. 10

[11/14/03 15:55:57.057 CST] Servlet.Engine.Transports : 0:DEBUG       /‾1101
com.ibm.etc.cct.adapter.esm63.ejb.ESMAdapter63Bean.DataAccessManager - SQL
       1102⌒\      ⌒1104       ⌒1106
Stmt:SELECT PROBLEMS.PROBLEM_ID, PROBLEMS.FIRST_PEOPLE_ID FROM
1108⌒\                                                              ⌒1110
TSD630UC.PROBLEMS PROBLEMS WHERE 1=1 AND ( ( PROBLEMS.PROBLEM_ID <>?)
FETCH FIRST 201 ROWS ONLY

[11/14/03 15:55:57.057 CST] Servlet.Engine.Transports : 0:DEBUG
com.ibm.etc.cct.adapter.esm63.ejb.ESMAdapter63Bean.DataAccessManager-
setParameters(List parameters, PreparedStatement iPS):Param Type: CHAR Value:L ⌒1112

<?xml version="1.0" encoding="UTF-8"?>
<esm:esmML xmlns:xsi="http://www.w3.org/2001/XMLSchema-instance"
1122⌒  xmlns:esm="http://www.ibm.com/esm" ID="1">                    /‾1120
   1124⌒ <Transactions>
       ⌒<Response xsi:type="esm:ObjectResponseType" countryCode="fr" language code="FR"
       timeStamp="2003-11-14T22:04:24Z" timeZone="">
           <SystemID>eESM630</SystemID>        /‾1128
   1132⌒  <TransactionType>list</TransactionType>
           ⌒<ErrorCode>0</ErrorCode> ⌒1126          /‾1130
   1134⌒  <ResponseDescription>success</ResponseDescription>
       1136⌒ <Body xsi:type="esm:ObjectResponseBodyType">
           ⌒<esm:RowSet displayRowCount="10" fetchCount="201" maxRowCount="200"
           startRow="1" totalCount="200" esm:name="ProblemTicket">   ⌒1137
       1138/‾ <esm:Row esm:name="ProblemTicket" esm:rowNumber="1">
           1139/‾ <esm:Column>          /‾1140
                   <esm:name>ProblemTicket.id</esm:name>
                   <esm:value>SITEA-00000034       </esm:value>⌒1142
               </esm:Column>
               <esm:Column>
           1141/‾ <esm:name>ProblemTicket.Person.id</esm:name>⌒1144
                   <esm:value>470000003</esm:value>⌒1146
               </esm:Column>
           </esm:Row>
           ⌈<esm:Row esm:name="ProblemTicket" esm:rowNumber="2">
           │ <esm:Column>
           │   <esm:name>ProblemTicket.id</esm:name>
           │   <esm:value>SITEA-00000089       </esm:value>
       1148│ </esm:Column>
           │ <esm:Column>
           │       <esm:name>ProblemTicket.Person.id</esm:name>
           │       <esm:name>470000003</esm:value>
           │ </esm:Column>
           ⌊</esm:Row>
           </esm:RowSet>
       </Body>                          *FIG. 11*
   </Request>
   </Transactions>
</esm:esmML>

```
                                                            1200
                                           1203            ↙
<splitReferences>                          ↙
    <splitReference id="ProblemTicket.openDateTime">
        <reference>
1205 — <order>1</order>
1206 — <value>ProblemTicket.openDate</value>    }1204
        </reference>
        <reference>
1209 — <order>2</order>
1210 — <value>ProblemTicket.openTime</value>    }1208
        </reference>
        </splitReference>
    <splitReference id="ProblemTicketHistory.description">
        <reference>                            \
1215 — <order>1</order>                         1213
1216 — <splitLength>254</splitLength>
1217 — <value>ProblemTicketHistory.descriptionPart1</value>   }1214
        </reference>
        <reference>
1220 — <order>2</order>
1222 — <value>ProblemTicketHistory.descriptionPart2</value>   }1218
        </reference>
        </splitReference>
</splitReferences>
```

*FIG. 12A*

```
                                                                    1223
                                              1225                 /
    <mergeReferences>                          /      1226
       <mergeReference id="ProblemTicket.openDate">  /
          <mergeReferenceId>ProblemTicket.openDateTime</mergeReferenceId>
          <reference>
1224     1228 ~<order>1</order>
          1229 ~<value>ProblemTicket.openTime</value>   }1227
          </reference>          1231
       </mergeReference>         /        1232
       <mergeReference id="ProblemTicket.openTime">  /
          <mergeReferenceId>ProblemTicket.openDateTime</mergeReferenceId>
          <reference>
1230     1234 ~<order>2</order>
          1235 ~<value>ProblemTicket.openDate</value>   }1233
          </reference>
       </mergeReference>
       <mergeReference id="ProblemTicketHistory.descriptionPart2">
          <mergeReferenceId>ProblemTicketHistory.description</mergeReferenceId>
          <reference>
1236           <order>2</order>
               <value>ProblemTicketHistory.descriptionPart1</value>
          </reference>
       </mergeReference>
       <mergeReference id="ProblemTicketHistory.descriptionPart1">
          <mergeReferenceId>ProblemTicketHistory.description</mergeReferenceId>
          <reference>
1242           <order>1</order>
               <value>ProblemTicketHistory.descriptionPart2</value>
          </reference>
       </mergeReference>
    </mergeReferences>
```

*FIG. 12B*

```xml
<?xml version="1.0" encoding="UTF-8"?>
<esm:esmML xmlns:xsi="http://www.w3.org/2001/XMLSchema-instance"
  xmlns:esm="http://www.ibm.com/esm" xmlns:etcML="http://www.ibm.com/v1/etcML" ID="2">
  <Transactions>
    <Request xsi:type="esm:ObjectRequestType" countryCode="fr" languageCode="FR"
    timeZone="" esm:agentID="EXAV" esm:userTrace="false">
      <SystemID>eESM630</SystemID>
      <TransactionType>get</TransactionType>
      <Parameters xsi:type="esm:ParameterType">
        <etcML:RequestedFields>
          <RequestedField>ProblemTicket.openDateTime</RequestedField>
        </etcML:RequestedFields>
        <etcML:StartRow>1</etcML:StartRow>
        <etcML:DisplayRowCount>10</etcML:DisplayRowCount>
      </Parameters>
      <etcML:Filters operator="AND">
        <etcML:Filter key="ProblemTicket.id" operator="Equal">
          <etcML:Value>SITEA-00001262</etcML:Value>
        </etcML:Filter>
      </etcML:Filters>
      <esm:TransactionTarget>ProblemTicket</esm:TransactionTarget>
    </Request>
  </Transactions>
</esm:esmML>
```

1400 (top), 1402 points to `<RequestedField>ProblemTicket.openDateTime</RequestedField>`

FIG. 14A

```xml
<?xml version="1.0" encoding="UTF-8"?>
<esm:esmML xmlns:xsi="http://www.w3.org/2001/XMLSchema-instance"
xmlns:esm="http://www.ibm.com/esm" xmlns:etcML="http://www.ibm.com/v1/etcML" ID="2">
    <Transactions>
        <Request xsi:type="esm:ObjectRequestType" countryCode="fr" languageCode="FR"
timeZone="Europe/Paris" esm:agentID="EXAV" esm:userTrace="false">
            <SystemID>eESM630</SystemID>
            <TransactionType>get</TransactionType>
            <Parameters xsi:type="esm:ParameterType">
                <etcML:RequestedFields>
                    <RequestedField>ProblemTicket.openDate</RequestedField>
                    <RequestedField>ProblemTicket.openTime</RequestedField>
                </etcML:RequestedFields>
                <etcML:StartRow>1</etcML:StartRow>
                <etcML:DisplayRowCount>10</etcML:DisplayRowCount>
            </Parameters>
            <etcML:Filters operator="AND">
                <etcML:Filter key="ProblemTicket.id" operator="Equal">
                    <etcML:Value>SITEA-00001262</etcML:Value>
                </etcML:Filter>
            </etcML:Filters>
            <esm:TransactionTarget>ProblemTicket</esm:TransactionTarget>
        </Request>
    </Transactions>
</esm:esmML>
```

1410 (labels: 1413, 1415, 1417, 1412, 1414)

[11/14/03 16:00:16.016 CST] Servlet.Engine.Transports : 0:DEBUG
com.ibm.etc.cct.adapter.esm63.ejb.ESMAdapter63Bean.DataAccessManager-SQL
Stmt:SELECT PROBLEMS.OPEN_DATE, PROBLEMS.OPEN_TIME FROM 1418     1420

TSD630UC.PROBLEMS PROBLEMS WHERE 1=1 AND ((PROBLEMS.PROBLEM_ID = ?
)) FETCH FIRST 2 ROWS ONLY
[11/14/03 16:00:16.016 CST] Servlet.Engine.Transports : 0:DEBUG
com.ibm.ect.cct.adapter.esm63.ejb.ESMAdapter63Bean.DataAccessManager -
setParameters(List parameters, PreparedStatement iPS):Param Type: CHAR Value:SITEA-
00001262

*FIG. 14C*

| PROBLEMS ||
|---|---|
| OPEN_DATE | OPEN_TIME |
| AUG 26, 2003 | 8:32:19 PM |

*FIG. 14D*

```
<?xml version="1.0" encoding="UTF-8"?>
<esm:esmML xmlns:xsi="http://www.w3.org/2001/XMLSchema-instance"
xmlns:esm="http://www.ibm.com/esm" ID="2">
  <Transactions>
    <Response xsl:type="esm:ObjectResponseType" timeStamp="2003-11-14T22:08:47Z">
      <SystemID>eESM630</SystemID>
      <TransactionType>get</TransactionType>
      <ErrorCode>0</ErrorCode>
      <ResponseDescription>success</ResponseDescription>
      <Body xsl:type="esm:ObjectResponseBodyType">
        <esm:RowSet fetchCount="1" maxRowCount="1" startRow="1" totalCount="1"
esm:name="ProblemTicket">
          <esm:Row esm:name="ProblemTicket" esm:rowNumber="1">
            <esm:Column>
1432 —   <esm:name>ProblemTicket.openDateTime</esm:name>
1434 —   <esm:value>Aug 26, 2003 8:32:19 PM</esm:value>
            </esm:Column>
          </esm:Row>
        </esm:RowSet>
      </Body>
      <esm:TransactionTarget>ProblemTicket</esm:TransactionTarget>
    </Response>
  </Transactions>
</esm:esmML>
```

*FIG. 14E*

METHOD AND APPARATUS FOR SPLITTING AND MERGING REQUEST AND RESPONSE DATA AT RUNTIME

CROSS REFERENCE TO RELATED APPLICATIONS

The present invention is related to the following applications entitled "METHOD AND APPARATUS FOR VALIDATING AND CONFIGURING DATABASE TRANSACTION REQUESTS FROM MULTIPLE CLIENTS", Ser. No. 10/756,932, filed on Jan. 14, 2004, and "METHOD AND APPARATUS FOR GENERATING QUERY AND RESPONSE STATEMENTS AT RUNTIME FROM GENERIC REQUESTS", Ser. No. 10/803,658, filed on Mar. 18, 2004, assigned to the same assignee, and incorporated herein by reference.

BACKGROUND OF THE INVENTION

1. Technical Field

The present invention relates generally to an improved data processing system and, in particular, to a method and system for accessing objects in a data store. Still more particularly, the present invention relates to a method, apparatus, and computer instructions for splitting data of a request into multiple fields and merging multiple column data of a data store into a response message at run time from generic request and response messages without client knowledge of the data store structure.

2. Description of Related Art

With the rise of the Internet, the ease of information exchange is pertinent to any application that facilitates data transactions. Particularly, in a World Wide Web environment, where service providers and consumers meet to conduct business, the efficiency of storing and retrieving business data is important to the success of business transactions. Various solutions have been developed to facilitate information exchange and storage of business data.

One solution for data exchange uses an XML Extender. An XML Extender is a component of DB2 Universal Database, a product available from International Business Machine Corporation. XML Extender makes use of extensible markup language (XML), a markup language available from the World Wide Web Consortium (W3C), to generate requests for business objects in a data store. XML allows users to flexibly define the structure of a query using a set of XML schemas. XML schemas define a set of elements that an XML message should include in order to exchange information with a data store. Thus, an XML message must adhere to the XML schemas in order to interact with the data store.

However, the XML Extender requires a client application to have knowledge of the specific data store, for example, a table name and table column name, in order to send an XML query message. In addition, the client application is required to have the ability to issue a structured query language (SQL) statement to be executed against the data store. SQL is an industry standard for constructing database queries. Furthermore, the amount of code required to support the variety of actions performed on the object is large since each action in the XML query may be different.

Often, a data provider maintains information in a data store that is accessible by a wide variety of clients. For various reasons, an information provider may desire to conceal a database or data store data structure from serviced clients. However, in doing so, the types of data operations the clients may perform on the data is limited. For example, a client attempting to insert data into a particular column of a database may inadvertently attempt to insert an amount of data that exceeds a column width or character length. In such a situation, an error may be generated or the insert data may be truncated. In other situations, it may be desirable to provide client access to data of multiple database columns, or multiple columns of multiple database tables, as a single data column. However, an XML Extender, for example, requires exposing the database structure to the client application.

Therefore, it would be advantageous to have a generic set of XML schemas and messages that are not data store specific. In addition, it would be advantageous to have a set of generic XML schemas that facilitate generation of SQL statements from an XML query that does not include a SQL statement. Moreover, it would be advantageous to provide a method of splitting data into multiple columns from a request and merging data from multiple columns of a data store into a response at run time.

SUMMARY OF THE INVENTION

The present invention provides a method in a data processing system for generating return data responsive to a database request. A response from a data store is detected. A merge reference section in a singleton in-memory object is located. A merge reference of the merge reference section is identified. A reference column from the merge reference is determined and data is merged with the reference column to form a merged value according to an order. The merged value is then placed in the response. Additionally, a method in a data processing system for executing a request on a data store is provided. A request is received that contains data. A split reference section in a singleton in-memory object is located. A split reference from the split reference section is identified. A reference column from the split reference is determined. A value from the data is extracted and placed in the reference column according to an order.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6A is a diagram illustrating an example implementation of esmBase.xsd in accordance with a preferred embodiment of the present invention;

FIG. 6B is a diagram illustrating an example implementation of esmBase.xsd in accordance with a preferred embodiment of the present invention;

FIG. 7A is a diagram illustrating an example implementation of etcml.xsd in accordance with a preferred embodiment of the present invention;

FIG. 7B is a diagram illustrating an example implementation of etcml.xsd in accordance with a preferred embodiment of the present invention;

FIG. 7C is a diagram illustrating an example implementation of etcml.xsd in accordance with a preferred embodiment of the present invention;

FIG. 7D is a diagram illustrating an example implementation of etcml.xsd in accordance with a preferred embodiment of the present invention.

FIG. 8 is a diagram illustrating an example implementation of etcml_redefines.xsd in accordance with a preferred embodiment of the present invention;

FIG. 9 is a flowchart illustrating an exemplary process for generating SQL statements at runtime from generic XML request and response messages in accordance with a preferred embodiment of the present invention;

FIG. 10 is a diagram illustrating an example request using a request XML message in accordance with a preferred embodiment of the present invention; and FIG. 11 is a diagram illustrating an example generated SQL statement and a response using a response XML message depicted in accordance with a preferred embodiment of the present invention;

FIG. 12A is a diagram illustrating an example split references section of the configuration Java bean in accordance with a preferred embodiment of the present invention;

FIG. 12B is a diagram illustrating an example merge references section of the configuration Java bean in accordance with a preferred embodiment of the present invention;

FIG. 14A is a diagram illustrating an example request XML message with a merged value in accordance with a preferred embodiment of the present invention;

FIG. 14B is a diagram illustrating an example request XML message for merging data in accordance with a preferred embodiment of the present invention;

FIG. 14C is an example SQL statement generated from a request XML message of FIG. 14B in accordance with a preferred embodiment of the present invention;

FIG. 14D is a diagram illustrating an example database table PROBLEMS in accordance with a preferred embodiment of the present invention; and FIG. 14E is a diagram illustrating an example response XML message using merge references in accordance with a preferred embodiment of the present invention.

DETAILED DESCRIPTION OF THE PREFERRED EMBODIMENT

Figure 1:
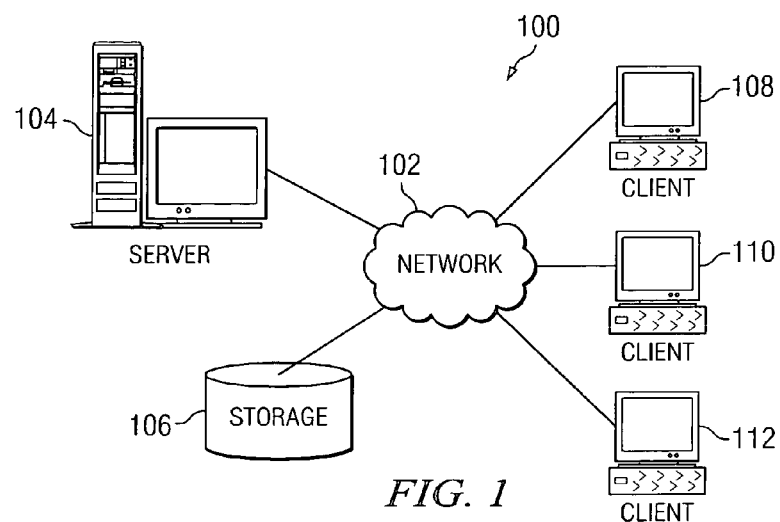
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communication links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
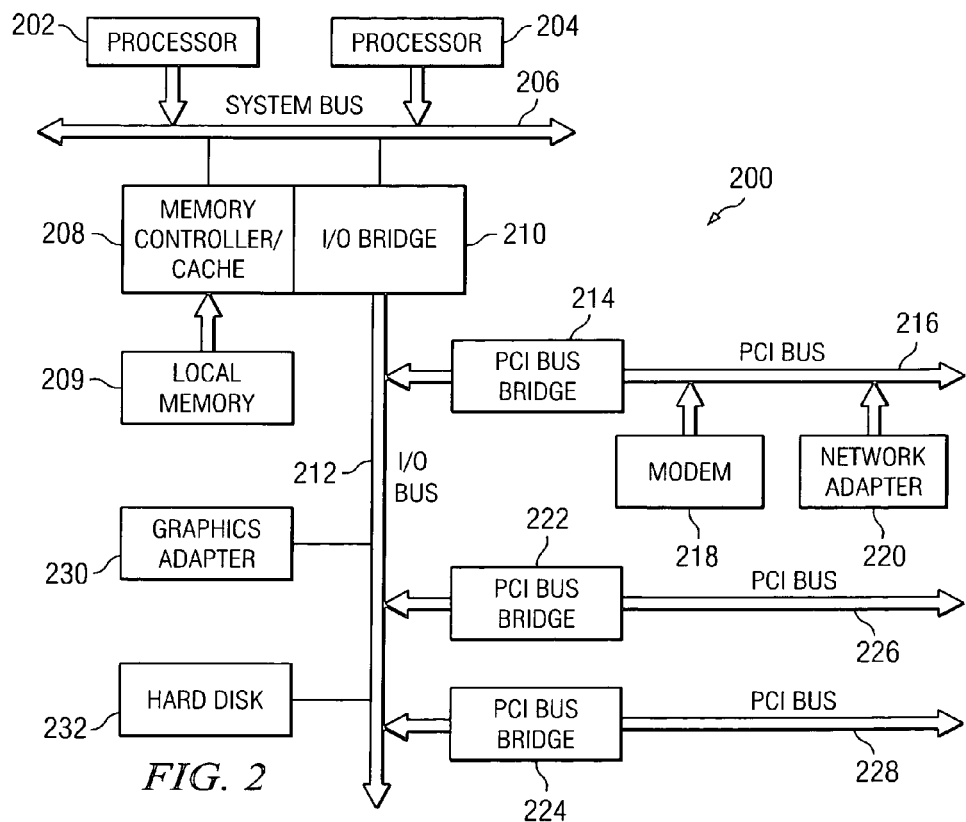
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communication links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
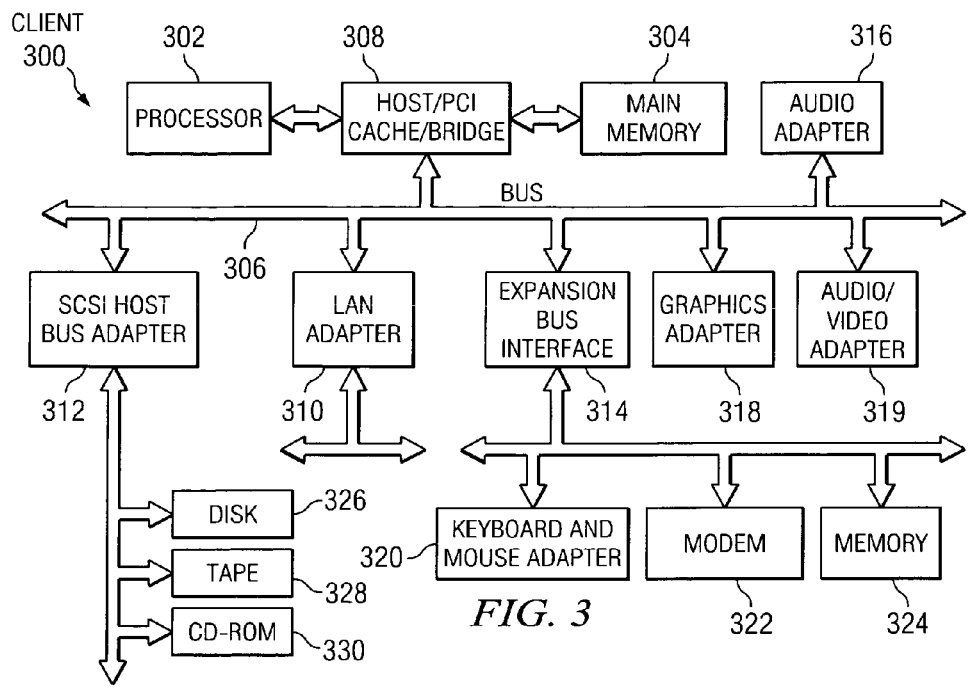
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides an improved method, apparatus and computer instruction for generating an SQL statement from generic XML request and response messages. The present invention provides a set of generic XML schemas for generating SQL statements to retrieve or submit information to a specific data store without requiring a client application to have knowledge of how to access the data store. An example of a data store is DB2 Universal Database, a product available from International Business Machines Corporation.

An XML message of the present invention is defined using a set of generic XML schemas that are not data store specific. Thus, any client application may interact with any type of data store using the features of the present invention without the need of special XML schema definitions or application programming interfaces (APIs). Furthermore, the present invention supports complex objects, such as nested lists or nested objects. A nested object includes sub-objects. For example, a ProblemTicket object may include a ProblemTicket.Person sub-object.

In the present invention, each type of request to the data store includes only one business process and therefore reduces the amount of code required to support all other possible requests. For example, a request to get records from the data store for a specific object may be implemented using the same request XML message as a request to update the data store.

In a preferred embodiment, the present invention includes a set of generic XML schemas that define a number of actions a client application may perform on information for a given object. An object is a data entity that includes a set of attributes and subobjects. For example, a ProblemTicket is an object that includes attribute id and subobject Person. The object may be stored in a data store along with its attributes and subobjects. Using this set of generic XML schemas, the client application may send a request XML message to be processed by an adaptor. An adaptor generates and executes SQL statements against a data store to submit or retrieve information to or from the object. In an example implementation, the adaptor is a component of WebSphere Application Server for data access, which is a product available from International Business Machines Corporation. When results are returned from execution of the generated SQL statement, the adaptor returns the results using a response XML message that adheres to the generic XML schemas. The client application may obtain the results from the response XML message.

Examples of actions a client application may perform on objects include, for example, add, delete, get, list, modify, and validate. The "add" action creates a new record in the data store for the selected object. An object may be any object that includes a number of attributes. For example, an object may be a problem ticket that includes a number of attributes, such as id, call back date, etc. The "delete" action deletes an existing record for the selected object from the data store. The "get" action retrieves an existing record for the selected object from the data store. The "list" action returns a list of requested fields for objects that match the filter criteria. The "modify" action updates an existing record for the selected object. The "validate" action validates the selected object with a value using a condition operator.

Figure 4:
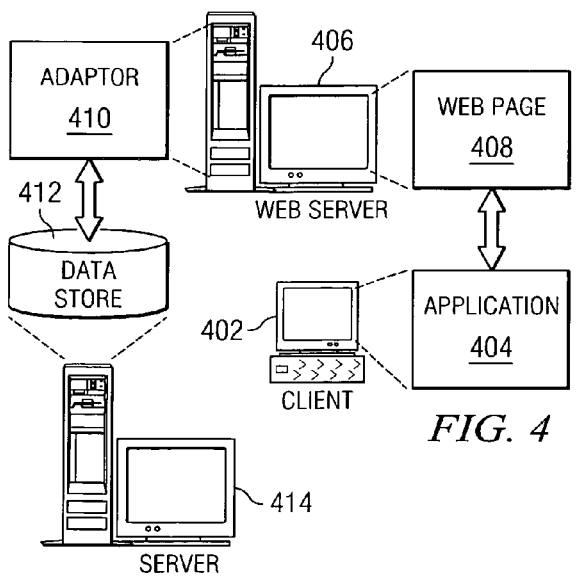
FIG. 4 is a diagram illustrating components used for generating SQL statements from generic and abstract XML request and response messages in accordance with a preferred embodiment of the present invention.

Turning now to FIG. 4, a diagram illustrating components used for generating SQL statements from generic XML request and response messages is depicted in accordance with a preferred embodiment of the present invention. As depicted in FIG. 4, client 402 may execute an application, such as application 404, to submit or retrieve information to or from Web page 408 that is stored in Web server 406. Client 402 may be implemented as data processing system 100 in FIG. 1 and Web server 406 may be implemented as server 104 in FIG. 1. An example of Web server 406 may be WebSphere Application Server, a product available from International Business Machines Corporation. Application 404 may be implemented as a Web browser, a Java application, a plugin to a Web browser or any other types of client applications.

Client 402 requests information, such as a problem ticket with a specific id, from application 404 to Web page 408. Web page 408 may request information from the adaptor 410, which interacts with data store 412, to retrieve information. Data store 412 may be implemented on server 414 or within Web server 406. In these examples, Web page 408 may be implemented as a servlet.

In conventional systems, in order to retrieve information from data store 412, Web page 408, which interprets a request from application 404, is required to include logic for specifying a particular data store 412 to which the request is directed. The logic specifying the data store includes a table name of the object requested, table column-name for requested fields, etc. In addition, Web page 408 logic is required to include SQL for the request data in order to submit a query in a format that is understood by data store 412. In accordance with embodiments of the invention, logic for specifying the particular data store and SQL logic is not required to be included in Web page 408.

In this example implementation, Web server 406 includes an engine, adaptor 410, which is a set of APIs that interacts with data store 412 by generating and executing SQL statements using parameters provided by client 402 through web page 408. Adaptor 410 is a data access framework provided by WebSphere Application Server in these illustrated examples. Using the features of the present invention, upon receipt of a request from application 404, logic of Web page 406 in Web server 408, which interprets the request from application 404, assembles a request XML message that is defined by a set of generic XML schemas. The set of generic schemas identifies the type of requests, the requested fields of the object and any other parameters required to generate an SQL statement. Upon completion of the assembly, logic of Web page 408 may forward the request XML message to adaptor 410, which then generates and executes an SQL statement using values of the request XML message.

Once information is retrieved from data store 412, adaptor 410 returns the information to logic of Web page 408 in a form of a generic response XML message. Logic of Web page 408 then disassembles the values in the response XML message into a response to application 404 on client 402. Thus, using the features of the present invention, logic of Web page 408 may request information from a specific type of data store without specifying the data store or SQL-formatted request data.

Figure 5:
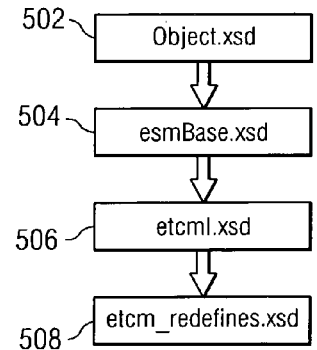
FIG. 5 is a diagram illustrating a set of XML schemas used for generating SQL statements in accordance with a preferred embodiment of the present invention.

Turning next to FIG. 5, a diagram illustrating a set of XML schemas used for generating SQL statements is depicted in accordance with a preferred embodiment of the present invention. As depicted in FIG. 5, the present invention includes a plurality of schemas including schema object.xsd 502, which describes the structure of a transaction. A transaction may include a request type, a response type and a response body, all of which are elements defined in the schema esmBase.xsd 504. Schema esmBase.xsd 504 defines what a request or response consists of. For example, a response may include a number of rows, which define names of objects requested. Additionally, rows may be nested. Within each row, there are a number of columns, which define names of the requested fields within objects requested. Within each column, there may be a number of enums, which return a number of options, such as options for a drop down box in a user interface. Schema esmBase.xsd 504 includes and extends elements defined in schema etcml.xsd 506. Hence, etcml.xsd 506 is the parent of esmBase.xsd 504.

Schema etcml.xsd 506 defines the core structure for an etcML based language. In the context of the present invention, an etcML based language is a language used to define structures of all allowed transactions. For example, schema etcml.xsd 506 includes an etcRootType, which is an element that defines a collection of transactions that a client, such as client 402 in FIG. 4, may perform over a set of generic request and response XML messages. For each transaction, at most one request or response is present. A response is defined by TransactionResponseType and a request is defined by TransactionRequestType. These types are described in further details in FIGS. 6A, 6B, 7A, 7B, 7C and 7D.

For each transaction type, a ProviderActionType is defined for actions available for each transaction to perform. Example actions for a transaction type include, add, delete, get, list, validate, and modify. ProviderActionType is defined in schema etcml_redefine.xsd 508, which may easily be modified. A set of error messages for a response may also be defined by using a ProviderErrorCodeType, which is also defined in schema etcml_redefined.xsd 508.

Turning now to FIG. 6A, a diagram illustrating an example implementation of schema esmBase.xsd 600 is depicted in accordance with a preferred embodiment of the present invention. As depicted in FIG. 6A, in this example implementation, schema esmBase.xsd 600 defines the structure of a request or response. EsmML 602 is the root element extended from the etcRootType 604 defined in schema etcml.xsd. etcRootType 604 represents a collection of transactions. If the transaction is a response XML message, the response XML message includes a body, defined by ESM-ResponseBodyType 606. ESMResponseBodyType 606 includes a RowSetType element 608 and a PropertiesType 610, both of which are described in further details in FIG. 6B. In addition, schema esmBase.xsd 600 includes a ParameterType 612, which is extended from schema ectml.xsd 506. ParameterType 612 defines a number of parameters that a client may request through a request XML message, such as, for example, a number of RequestedFields 614, Start Row number 616, Display Row Count 618, etc.

Turning next to FIG. 6B, a diagram illustrating an example implementation of esmBase.xsd is depicted in accordance with a preferred embodiment of the present invention. FIG. 6B is a part of esmBase.xsd in continuation of FIG. 6A. As depicted in FIG. 6B, in this example implementation, a response includes a PropertiesType 620, which includes FieldType 622, represented by block 623. FieldType 623 specifies name 624 and value 626 of a RequestedField, which is originally requested by the client in FIG. 6A. For example, the name of a RequestedField may be a ProblemTicket.id and the value may be SITEA-00000034.

As described in FIG. 6A, in addition to PropertiesType 620, a response includes RowSetType 628, which includes a number of rows 629. RowSetType 628 may be used in the present invention as a response or as a request to perform add or modify actions for updating records of an object. Each row 629 within RowSetType 628 represents an object returned from the data store after meeting a certain criteria. The number of rows may be specified by the client using Start. Row number 616 and Display Row Count 618 in FIG. 6A. Row 629 is depicted by RowType 630. RowType 630 includes a ColumnType 632 and a nested RowSetType 634. Thus, a row may be embedded within another row for nested objects.

ColumnType 632 represents a RequestedField requested by the client, such as ProblemTicket.id. In addition to a name and a value as described above, ColumnType 632 includes an enums, defined by EnumsType 638, represented in block 640. EnumsType 640 is used to provide a list of strings in a response XML message. For example, the list of strings may define options a user may choose in a drop down box of the user interface.

With reference to FIG. 7A, a diagram illustrating an example implementation of schema etcml.xsd is depicted in accordance with a preferred embodiment of the present invention. As depicted in FIG. 7A, schema etcml.xsd 700 is the parent schema of schema esmBase.xsd as described in FIGS. 6A and 6B. Schema etcml.xsd 700 includes etcRootType 702, which includes a number of transactions defined by TransactionsContainerType 704. TransactionContainerType 704, represented in block 706, may either be a request, represented by TransactionRequestType 708, or a response, represented by TransactionResponseType 710. TransactionRequestType 712 includes a TransactionType 714, which is represented in block 720. TransactionType 720 describes attributes of a transaction, such as, for example, userID and password required, timestamp of the transaction, language, country, and time zone of the transaction.

In addition to TransactionType 714, TransactionRequestType 712 also includes ProviderType 716. ProviderType 716 is represented in block 722, which defines all backend data store systems available. In this example, data store e-ESM61 724 and e-ESM44 726 are available for storing and retrieving information of an object.

With reference to FIG. 7B, a diagram illustrating an example implementation of etcml.xsd is depicted in accordance with a preferred embodiment of the present invention. FIG. 7B is part of etcml.xsd in continuation of FIG. 7A. As depicted in FIG. 7B, a client may send a custom request that includes built-in functionality, such as sorting and filtering, for the results of the request. This functionality is provided by TransactionFilteredRequestType 730.

TransactionFilteredRequestType 730 provides Sort 734 and Filters 732 functions. Sort 734 function is represented by block 736, which includes a SortOrderType 738. SortOrderType, represented by block 742, includes an attribute SQLGroupByOperatorType 744. SQLGroupByOperatorType 744, represented by block 746, allows the client to sort the results of the request in either ascending 748 or descending 750 order. This operator is part of an SQL statement that will be generated.

As described above, the client may also filter the results using Filters 732 function. Filters 732 is represented by block 752. Block 752 includes a number of Filter 754 and a required attribute of SQLConditionJoinOperatorType 758 both of which are described in further details in FIG. 7C. Unlike sorting, filtering may be nested. Therefore, Filters 756 is included within Filters 752.

With reference to FIG. 7C, a diagram illustrating an example implementation of etcml.xsd is depicted in accordance with a preferred embodiment of the present invention. FIG. 7C is part of etcml.xsd in continuation of FIGS. 7A and 7B. As described in FIG. 7B, Filters includes a SQLConditionJoinOperatorType 758 represented by block 760, which includes join operators And 762 or Or 764. The join operator becomes part of an SQL statement that will be generated by the adaptor.

In addition, Filter 754 in FIG. 7B is defined by Filter Type 768. Filter Type 768 includes a value, which is compared to a key using a condition operator. The condition operator is defined by SQLConditionOperatorType 770. SQLConditionOperatorType 770 is represented by block 772 and includes condition operators, such as equal, greater than, less than, less than or equal to, greater than or equal to, not equal to, etc. For example, a client may send a request to retrieve information for a ProblemTicket.id that is not equal to L. ProblemTicket.id is the object key, L is the value, and not equal to is the condition operator. The key, value and the condition operator are also part of the SQL statement that will be generated by the adaptor.

Thus far we have discussed what a request XML message consists of. We now turn to a discussion of a response XML message. A response is defined by TransactionResponseType 774. TransactionResponseType 774, similar to TransactionRequestType 712 in FIG. 7A, also includes a TransactionType and a ProviderType. However, TransactionResponseType 774 also includes a body, defined by ResponseBodyType 776, which is extended by ESMResponseBodyType 706 in FIG. 7A. Moreover, TransactionResponseType 774 includes ErrorCode 778.

With reference to FIG. 7D, a diagram illustrating an example implementation of etcml.xsd is depicted in accordance with a preferred embodiment of the present invention. FIG. 7D is part of etcml.xsd in continuation of FIG. 7C. ErrorCode 778 shown in FIG. 7C is defined by block 780. ProviderErrorCodeType 780 describes a set of error messages that may be returned to the client in a response. A default value 782 of 0 may be returned for a successful response and default value 786 of 10000 may be returned for a system failure 788. The client may further customize the error messages using etcml_redefines.xsd schema, which is described in further details in FIG. 8.

Turning now to FIG. 8, a diagram illustrating an example implementation of etcml_redefines.xsd is depicted in accordance with a preferred embodiment of the present invention. As depicted in FIG. 8, etcml_redefines.xsd 800 includes ProviderActionType 820, which allows a client to perform a number of actions. In this example, clients are allowed to perform add, delete, get, list, validate and modify actions. These actions are described further below:

The add action creates a new record for the selected object. The object is unlocked once it is created to allow modification.

The delete action deletes an existing record for the selected object. For example, a ProblemTicket.Person object or objects within ProblemTicket may be deleted. The get action allows a client to retrieve an existing record for the selected object. If no object matches the criteria, an error code of 0 is returned. Results of a get action may include nested objects. Get action also provides a LockObject property to the recipient of the object, so that the object may be locked for update.

The list action returns a list of requested fields, such as ProblemTicket.id, after matching filter criteria of the request. If no object matches the criteria, an error code of 0 is returned. Similar to the get action, the list action may return nested objects.

The modify action allows a client to update an existing record for the selected object. An object has to be unlocked or already locked by the client in order to be modified.

The validate action applies a filter against an object key and a value using a condition operator, such as equal to, not equal to, etc. The error code is non-zero if the validation fails. If validation succeeds, the result includes the value of the object key, if the object key is case-insensitive. Thus, the client may obtain the actual value of the object key as it is a requested field.

Etcml_redefines.xsd 800 also includes a ProviderErrorCodeType 822, which defines a range of error codes to be returned to the client. In this example, a range of 0 to 12000 of valid error code values are allowed.

Turning next to FIG. 9, a flowchart illustrating an exemplary process for generating SQL statements at runtime from a generic XML request or response message is depicted in accordance with a preferred embodiment of the present invention. As depicted in FIG. 9, the process begins when the client, such as client 402 in FIG. 4, sends a request for information to the server (step 902). The server, such as Web server 408 in FIG. 4, assembles the XML request message (step 904) according the format defined by the generic XML schemas. Once the XML message is assembled, the server sends the request XML message to adaptor 410 (step 906).

Next, adaptor 410 generates an SQL statement using the values from the assembled XML message (step 908). Once the SQL statement is generated, the adaptor executes the SQL statement (step 910) against the data store to obtain the information. Once the result is returned from the data store, adaptor 410 sends the result to the server in a response XML message (step 912). The server then disassembles the response XML message into return values according to the set of generic schemas (step 914).

Finally, the server sends the return values to the client with the requested information (step 916). The process terminates thereafter.

Turning now to FIG. 10, a diagram illustrating an example XML request message is depicted in accordance with a preferred embodiment of the present invention. As depicted in FIG. 10, in this example implementation, request XML message 1000 includes a Transaction 1002. Transaction 1002 including a Request 1004 to perform a list action, as described by TransactionType 1006, against data store with SystemID 1008 of "eESM630". Request 1004 includes a set of Parameters 1010. Parameter 1010 includes an attribute parametertype 1011 defined by ParametersType 1011 in esmBase.xsd as described in FIGS. 6A and 6B.

Parameters 1010 includes two RequestedFields, namely ProblemTicket.id 1012 and ProblemTicket.Person.id 1014. Parameters 1010 also includes a StartRow 1016 with a value of 1 and a DisplayRowCount 1018 with a value of 10, which defines a request of rows 1 through 10 for the RequestedFields values. In this example, request 1004 is a custom request, which includes Filters 1020. Filters 1020 filters the results using condition join operator 'AND' 1022, a value 1024 of L, and a condition operator 1026 of "NotEqualTo" against the object key of ProblemTicket.id 1026.

Turning to FIG. 11, a diagram illustrating an example generated SQL statement and a response using a response XML message is depicted in accordance with a preferred embodiment of the present invention. As depicted in FIG. 11, in this example implementation, the SQL statement generated by the adaptor from request 1004 in FIG. 10 is shown as SQL statement 1101.

Statement 1101 is a SELECT clause, where the table name for ProblemTicket is Problems 1102. The column name of requested field ProblemTicket.id 912 in FIG. 9 is PROBLEM_ID 1104 and the column name of requested field ProblemTicket.Person.id 914 in FIG. 9 is FIRST_PEOPLE_ID 1106. In addition, the real data store name is TSD630UC 1108, as opposed to eESM630 908 in FIG. 9. The WHERE clause includes filtering of PROBLEM_ID 1110 against the value of 'L' 1112.

After adaptor executes statement 1101, a response is returned using response XML message 1120. Response XML message 1120 includes Transactions 1122. Transactions 1122 includes Response 1124 for a list action, as described by TransactionType 1126, against data store with SystemID "eESM630" 1128. Response 1124 is successful as described by ResponseDescription 1130 with an ErrorCode 1132 of 0. Within Response 1124, a Body 1134 includes a RowSet 1136, with a fetch count of 201. The fetch count indicates the number of records returned in this object, in this example, the object is the ProblemTicket 1137. Next, each record is represented by a Row 1138. Within Row 1138, there are 2 columns, column 1139 and column 1141.

Column 1139 includes name 1140 and a value 1142. Name 1140 represents ProblemTicket.id, which is the RequestedField. Value 1142 represents 'SITEA-00000034', which is returned from the data store.

Column 1141 also includes name 1144 and value 1146. Name 1144 represents ProblemTicket.Person.id, which is another RequestedField. Value 1146 represents 470000003, which is returned from the data store. Block 1148 represents the second record of the result returned from the data store.

In addition, the present invention provides new constructs in a singleton in-memory object, such as a configuration Java bean, for splitting and merging data in multiple database columns. As described in "METHOD AND APPARATUS FOR VALIDATING AND CONFIGURING DATABASE TRANSACTION REQUESTS FROM MULTIPLE CLIENTS", which is incorporated by reference above, a singleton in-memory object, such as a configuration Java bean, may be used to validate mandatory fields and configure requests provided by different clients. In the present invention, the configuration Java bean may be extended to validate a request that requires splitting a value into multiple database columns. In addition, after executing a query on a database, a response requiring merging of values from multiple database columns may also be validated using the configuration Java bean.

In a preferred embodiment, the new constructs of the present invention are new sections of the singleton in-memory object, such as a configuration Java bean, that provide configuration settings for generically splitting a requested field or column into multiple fields, and merging data from multiple columns into a single column of a response. Thus, using the new constructs, data requested as a single field request may be supplied from multiple columns by merging data from multiple columns into one field, and updates or inserts to a requested field may be split into updates or inserts to multiple database columns without the requesting client having knowledge of the database structure. The splitting section of the configuration Java bean is known as split references and the merging section of the configuration Java bean is known as merge references.

Turing now to FIG. 12A, a diagram illustrating an example split references section of the configuration Java bean is depicted in accordance with a preferred embodiment of the present invention. As depicted in FIG. 12A, in this example implementation, split references 1200 is a new section of the configuration Java bean. Split references 1200 includes split reference 1202 and split reference 1212. Split reference 1202 has an id of "ProblemTicket.openDateTime" 1203, which is the name of the requested field in the request XML message specified by the client for updating or querying data. Split reference 1202 holds references to multiple column mappings that relate the parameters in the request to actual database columns. For example, split reference 1202 includes two references: reference 1204 and reference 1208. Reference 1204 holds a reference to a first reference column, "ProblemTicket.openDate" 1206, with order 1205 of 1. The order specifies the order by which the value of the requested field will be placed. In this example, an order of 1 indicates a first part of the value in "ProblemTicket.openDateTime" 1203 will be placed in "ProblemTicket.openDate" 1206 reference column.

Reference 1208 holds a reference to a second reference column, "ProblemTicket.openTime" 1210, with order 1209 of 2. Thus, the second part of the value in "ProblemTicket.openDateTime" 1203 will be placed in "ProblemTicket.openTime" 1210 reference column. In this example, "ProblemTicket.openDate" 1206 corresponds to the actual OPEN_DATE column of the PROBLEMS table and ProblemTicket.openTime 1210 corresponds to the actual OPEN_TIME column of the PROBLEMS table.

Split reference 1212 includes an id of "ProblemTicketHistory.description" 1213, which is a description for the history of a problem ticket passed to a request XML message. Split reference 1212 also includes two references: reference 1214 and reference 1218. Reference 1214 holds a reference to first reference column, "ProblemTicketHistory.descriptionPart1" 1217, with order 1215 of 1.

In addition, reference 1214 includes a split length element 1216, which specifies the number of characters to be extracted from the value in the requested field, "ProblemTicketHistory.description" 1213, to be placed into the database column. In this example, "ProblemTicketHistory.descriptionPart1" 1217 corresponds to the actual DESCRIPTION_PART1 column of the PROBLEMS table. Thus, the first 254 characters will be placed into column DESCRIPTION_PART1. The remaining characters will be placed in the second reference column, "ProblemTicketHistory.descriptionPart2" 1222 of reference 1218 with an order 1220 of 2. Thus, using split references, even without having knowledge of the database, values of requested fields may still be dynamically split for any insert or update request by a configurable number of characters and data may be placed into multiple columns.

Turning next to FIG. 12B, a diagram illustrating an example merge references section of the configuration Java bean is depicted in accordance with a preferred embodiment of the present invention. As depicted in FIG. 12B, in this example implementation, merge references 1223 is a section of the configuration Java bean. Split reference 1223 includes four merge references: merge references 1224, 1230, 1236, and 1242.

Merge reference 1224 includes an id of "ProblemTicket.openDate" 1225, which represents the column whose values are to be merged with a value of one or more other columns when a response XML message is generated. Merge reference 1224 also includes a mergeReferenceId element with a value of "ProblemTicket.OpenDateTime" 1226, by which the merged value is returned when generating a response XML message. Merge reference 1224 includes reference 1227, which holds a reference to first reference column, ProblemTicket.openTime 1229 with order 1228 of 1. The order of 1 represents when a value from the OPEN_DATE column is combined with a value from the OPEN_TIME column for the merge. The value from the OPEN_DATE column will be the first value in the return merged value "ProblemTicket.openDateTime" 1226 followed by the value from the OPEN_TIME column.

Merge reference 1230 includes an id of "ProblemTicket.openTime" 1231. Merge reference 1230 also includes a mergeReferenceId element with a value of "ProblemTicket.openDateTime" 1232, which is the name of the requested field by which the merged value is returned. In addition, merge reference 1223 includes reference 1233, which holds a reference to a second reference column, "ProblemTicket.openDate" 1235, with order 1234 of 2. The order of 2 represents when a value from the OPEN_TIME column is merged with a value from the OPEN_DATE column. The value from the OPEN_DATE column will be the second value in the return merged value "ProblemTicket.openDateTime" 1232. Similarly, merge reference 1236 and merge reference 1242 allows DESCRIPTION_PART1 column value and DESCRIPTION_PART2 column value to be merged under the merged value "ProblemTicketHistory.description".

Figure 13A:
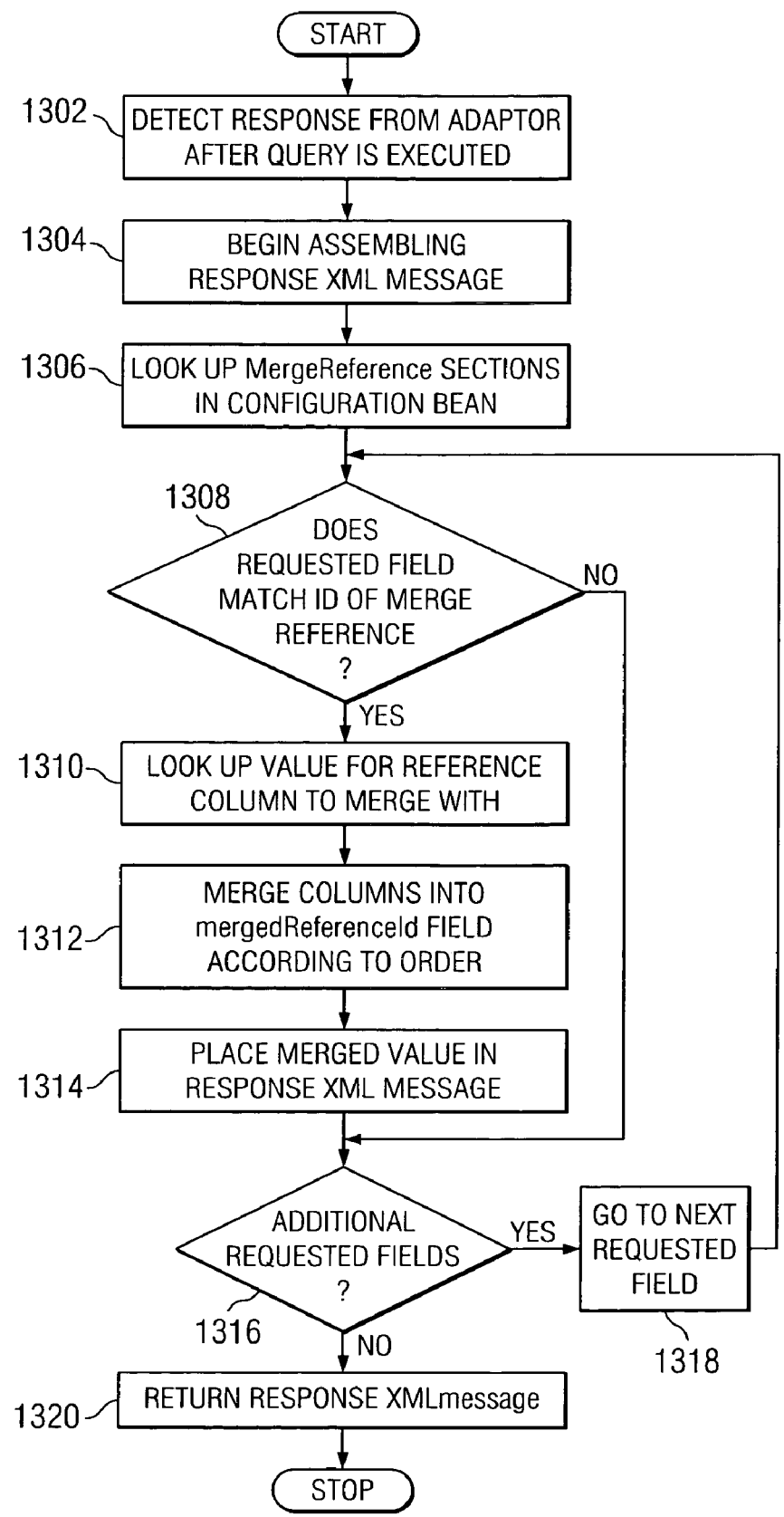
FIG. 13A is a flowchart illustrating an exemplary process for merging data using a merge reference in accordance with a preferred embodiment of the present invention.

Turning now to FIG. 13A, a flowchart illustrating an exemplary process for merging data using merge reference is depicted in accordance with a preferred embodiment of the present invention. As depicted in FIG. 13A, from the server's perspective, the process begins when the server detects a response from the adaptor after the query is executed on a database (step 1302). Upon receipt of the result, the server begins assembling a response XML message (step 1304). Next, the server looks up merge reference section of the configuration Java bean (step 1306). A determination is then made as to whether the requested field of the result matches the id of the mergeReference element in the merge reference section (step 1308). For example, an id of the merge reference element may be "ProblemTicket.resolveDate".

If the requested field does not match the id of the merge reference element, the process continues to step 1316. If the requested field matches the id of the mergeReference element in the merge reference section, the server looks up the value element of the reference element for the name of the reference column to merge with (step 1310). For example, the value of the reference element may be "ProblemTicket.resolveTime".

Next, the value of the requested field is merged with the value of the reference column according to the order element specified and the merged value is represented by the value of the mergedReferenceId element in the merge reference section (step 1312). For example, the value of the mergeReferenceId element may be "ProblemTicket.resolveDateTime". The merged value is then placed in the response XML message (step 1314).

A determination is then made as to whether there is an additional requested field represented by the mergeReference element in the merge reference section (step 1316). If there is additional requested field, the server proceeds to the next requested field (step 1318) and the process repeats from step 1308 for the next requested field. If there is no additional requested field, the server returns the response XML message to the requested client (step 1320) and the process terminates thereafter. Thus, using the construct of the present invention, a response with merged values from multiple database columns may be provided in response to execution of a request specifying only a single column of data.

Figure 13B:
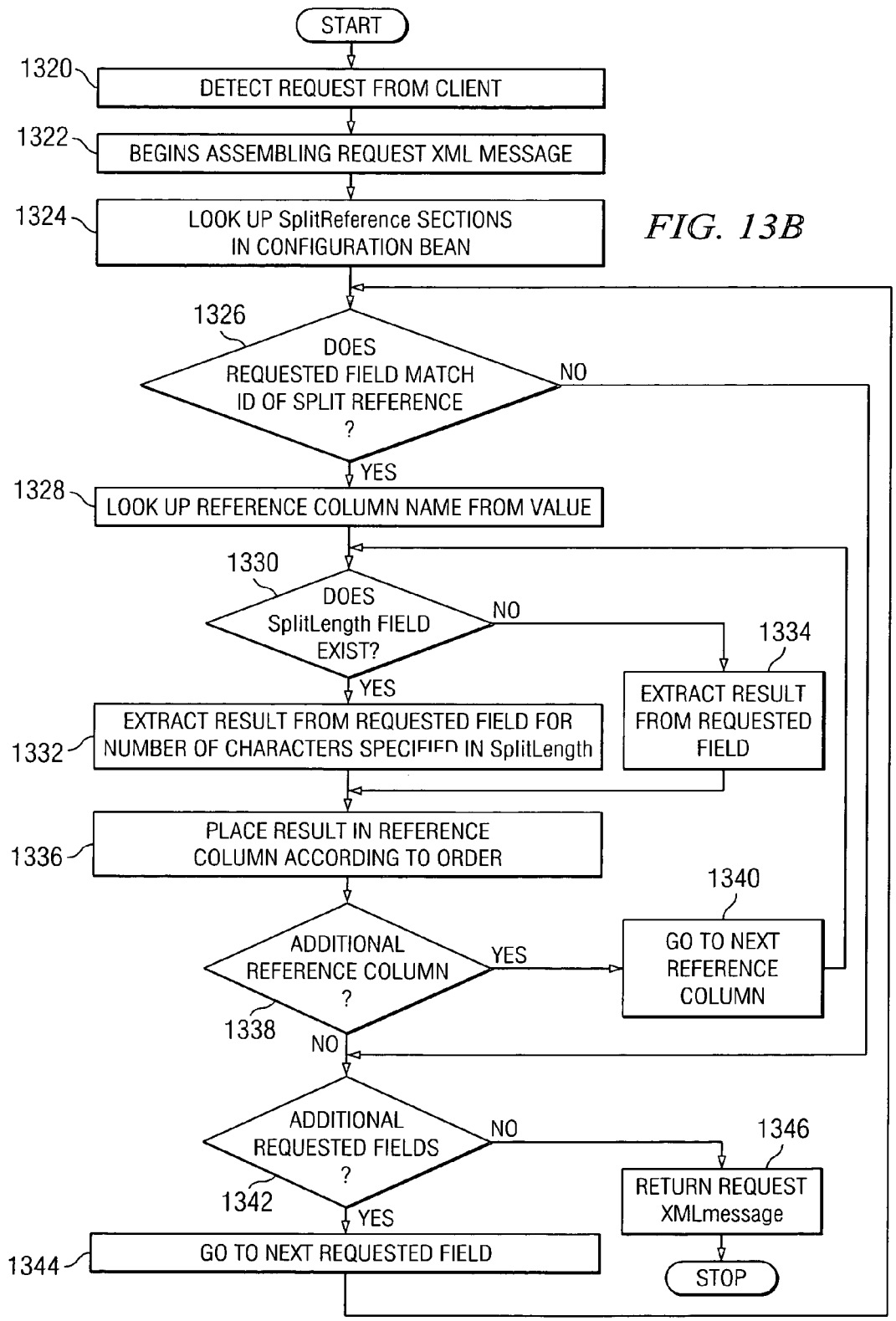
FIG. 13B is a flowchart illustrating an exemplary process for splitting data using a split reference in accordance with a preferred embodiment of the present invention.

Turning next to FIG. 13B, a flowchart illustrating an exemplary process for splitting data using split reference is depicted in accordance with a preferred embodiment of the present invention. As depicted in FIG. 13B, from the server's perspective, the process begins when the server detects a request from a client (step 1320). Upon receipt of the request, the server begins assembling a request XML message (step 1322). Next, the server looks up the split reference section of the configuration Java bean (step 1324). A determination is then made as to whether the requested field matches the id of the splitReference element in the split reference section (step 1326). For example, the id of the splitReference element may be "ProblemTicketHistory.description".

If the requested field does not match the id of the splitReference element, the process continues to step 1342. If the requested field matches the id of the splitReference, the server looks up the value element of the reference element for the name of the reference column to split into (step 1328). For example, the value element of the reference element may be "ProblemTicketHistory.descriptionPart1". Prior to splitting the requested field, a determination is made as to whether a splitLength element exists in the reference element (step 1330). The splitLength element describes the number of characters to be extracted from the value of the requested field in order to be placed into a database column.

If a splitLength element exists, the server extracts the number of characters specified in the splitLength element to be placed into the database column (step 1332). For example, if a splitLength element has a value of 254, the server extracts only the first 254 characters from the value of the requested field to be placed into the database column, with reference column name represented by the value element in step 1328. However, if a splitLength element does not exist in step 1330, the server simply extract all of the characters from the value of the requested field (step 1334).

Once the value of the requested field is extracted from the requested field in step 1332 or step 1334, the result is placed in the reference column in the order specified in the order element (step 1336). In this example, the first 254 characters of "ProblemTicketHistory.description" are placed into "ProblemTicketHistory.descriptionPart1" and the remaining characters are placed in "ProblemTicketHistory.descriptionPart 2".

A determination is then made as to whether there is an additional reference column to be split (step 1338). This may be determined by whether there are additional reference elements in the same splitReference element. If there is an additional reference column, the server goes to the next reference column (step 1340), represented by another reference element, and the process repeats from step 1330. If there is no additional reference column, a determination is made as to whether there is an additional requested field represented by the splitReference element in the split reference section (step 1342).

If there is an additional requested field, the server goes to the next requested field (step 1344) and the process repeats from step 1326. If no additional requested field is present, the server returns the request XML message (step 1346). Thus, the process terminates thereafter. By using the construct of the present invention, a request specifying a single column of data may have the single column of data split into multiple database columns without having knowledge of the database structure.

Turning next to FIG. 14A, a diagram illustrating an example request XML message with merged value is depicted in accordance with a preferred embodiment of the present invention. As depicted in FIG. 14A, in this example implementation, request XML message 1400 includes a requested field 1402, "ProblemTicket.openDateTime", which is a merged value sent by a client. In this example, openDateTime is formed with values from two columns: openTime and openDate.

Turning next to FIG. 14B, a diagram illustrating an example request XML message for merging data is depicted in accordance with a preferred embodiment of the present invention. As depicted in FIG. 14B, in this example implementation, the request XML message 1410 is the same as request XML message 1400 in FIG. 14A, except that the requested fields are different. In this example, the requested fields are "ProblemTicket.openDate" 1412 and "ProblemTicket.openTime" 1414. These two requested fields are placed in request XML message 1410 as a result of using the split reference section of the configuration Java bean.

Turning next to FIG. 14C, an example SQL statement generated from request XML message of FIG. 14B is depicted in accordance with a preferred embodiment of the present invention. As depicted in FIG. 14B, in this example implementation, the requested field "ProblemTicket.openDate" 1412 in FIG. 14B is represented in SQL statement 1416 as OPEN_DATE column in the PROBLEMS table 1418. The requested field "ProblemTicket.openTime" 1414 in FIG. 14B is represented in SQL statement 1416 as OPEN_TIME column in the PROBLEMS table 1420.

Turning next to FIG. 14D, a diagram illustrating an example database table PROBLEMS is depicted in accordance with a preferred embodiment of the present invention. As depicted in FIG. 14D, in this example implementation, PROBLEMS table 1421 includes two columns: OPEN_DATE 1422 AND OPEN_TIME 1424. Column OPEN_DATE 1422 corresponds to "ProblemTicket.openDate" 1412 in FIG. 14B, which includes a value of "Aug. 26, 2003". Column OPEN_TIME 1424 corresponds to "ProblemTicket.openTime" 1414 in FIG. 14B, which includes a value of "8:32:19 PM".

Turning next to FIG. 14E, a diagram illustrating an example response XML message using merge reference is depicted in accordance with a preferred embodiment of the present invention. As depicted in FIG. 14D, in this example implementation, response XML message 1430 is a response to request XML message 1400 in FIG. 14B. By using the merge references of the configuration Java bean, such as merge references 1223 in FIG. 12C, the value "Aug. 26, 2003" from column OPEN_DATE 1422 in FIG. 14D and the value "8:32:19 PM" from column OPEN_TIME 1424 in FIG. 14D are merged to be returned under requested field "ProblemTicket.openDateTime" 1432. The return merged value is now "Aug. 26, 2003 8:32:19 PM" 1434. The merged value is merged by creating a Java Date object and formatting the values from column OPEN_DATE 1422 and column OPEN_TIME 1424 to a locale specific format. This locale specific format is converted to a requested time zone using the "countryCode" 1413, "languageCode" 1415 and a "timeZone" 1417 in request XML message 1410 of FIG. 14B. In the example illustrated in FIG. 14B, "countryCode" 1413 has a value of "fr", "languageCode" 1415 has a value of "FR", and "timeZone" 1417 has a value of "Europe/Paris". Thus, values from multiple database columns may be merged into a single value by creating a Java object and formatting values from multiple columns into a single value. The values are merged without having knowledge of the database.

Thus, using the generic and abstract XML request and response messages of the present invention, a client may interact with the data store to retrieve or submit information about an object without knowledge of the structure of the data store. In addition, the present invention supports different types of data stores without requiring development of a special XML schema definition or APIs. Furthermore, the present invention supports complex objects, such as nested lists or nested objects. The generic nature of the XML schemas reduces the amount of code required to support other possible requests. A set of schemas is provided for facilitating the splitting of data into multiple columns from a request and merging data from multiple columns of a data store into a response at run time.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for executing a request on a data store, the method comprising:
   receiving a request containing data;
   responsive to receiving the request, locating a split reference section in a singleton in-memory object;
   identifying a split reference from the split reference section;
   determining a reference column from the split reference;
   extracting a value from the data, wherein extracting a value includes determining whether a split length element exists; and
   storing the value in the reference column according to an order.

2. The method of claim 1, wherein the singleton in-memory object is implemented as a configuration Java bean.

3. The method of claim 1, wherein the split reference section includes a plurality of split references.

4. The method of claim 1, wherein identifying the split reference includes determining whether an identifier of the split reference matches a requested field from a plurality of requested fields in the request.

5. The method of claim 1, wherein determining the reference column includes locating the column from a plurality of columns in the data store according to a value element of the split reference.

6. The method of claim 1, wherein, responsive to determining the split length element exists, the value includes a number of characters of the data specified in the split length element.

7. The method of claim 1, wherein, responsive to determining the split length element does not exist, the value includes a number of characters of the data remaining.

8. The method of claim 1, wherein the request is an extensible markup language request message.

9. The method of claim 1, wherein determining a reference column further comprises determining a plurality of reference columns, and extracting the value further comprises extracting a plurality of values, wherein a first value of the plurality of values is placed in a first column of the plurality of columns, and a second value of the plurality of values is placed in a second column of the plurality of columns.

10. A method in a data processing system for executing a request on a data store, the method comprising:
    receiving a request containing data;
    responsive to receiving the request, locating a split reference section in a singleton in-memory object;
    identifying a split reference from the split reference section;
    determining a reference column from the split reference;
    extracting a value from the data; and
    storing the value in the reference column according to an order, wherein the order is located in an order element of the split reference.

11. The method of claim 10, wherein the singleton in-memory object is implemented as a configuration Java bean.

12. A computer program product in a computer readable storage medium for executing a request on a data store, the computer program product comprising:
    first instructions for receiving a request from a client containing data, wherein the client does not have knowledge of a database structure for the data store;
    second instructions that locate a split reference section in a singleton in-memory object;
    third instructions for determining a reference column of a split reference in the split reference section; and
    fourth instructions that extract a value from the data, wherein extracting a value includes determining whether a split length element exists, and store the extracted value in the reference column, wherein the data is split into multiple columns of the data store, and wherein the order is located in an order element of the split reference.

13. The computer program product of claim 12, wherein the singleton in-memory object is a Java bean.

* * * * *